Sept. 6, 1927.

P. DONON 1,641,253

TRANSMISSION DEVICE FOR VEHICLES PROVIDED WITH TWO MOTORS

Filed April 18, 1925    3 Sheets-Sheet 1

Inventor
P. Donon
by Langner, Parry, Card & Langner
Att'ys.

Sept. 6, 1927. 1,641,253
P. DONON
TRANSMISSION DEVICE FOR VEHICLES PROVIDED WITH TWO MOTORS
Filed April 18, 1925   3 Sheets-Sheet 3
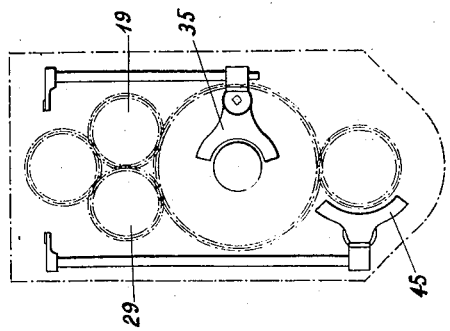
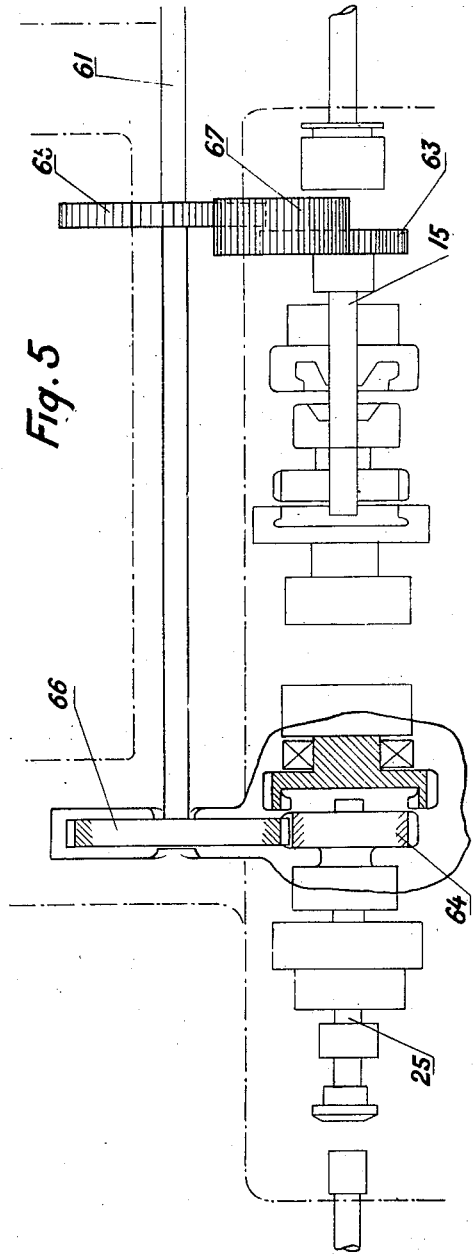
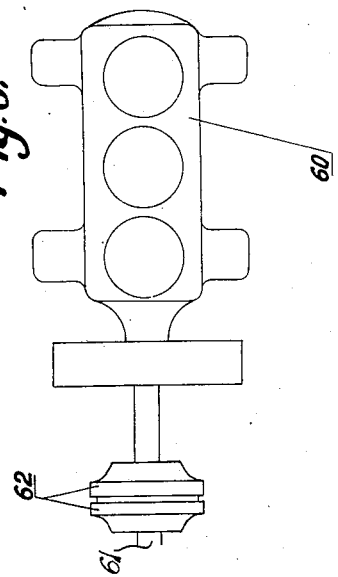
Inventor
P. Donon
by Langner, Parry, Card & Langner
Attys.

Patented Sept. 6, 1927.

1,641,253

UNITED STATES PATENT OFFICE.

PIERRE DONON, OF PARIS, FRANCE.

TRANSMISSION DEVICE FOR VEHICLES PROVIDED WITH TWO MOTORS.

Application filed April 18, 1925, Serial No. 24,083, and in France April 25, 1924.

The present invention relates to a transmission device for a vehicle provided at each extremity with a motor and an axle or a pair of axles. It is particularly intended for use with locomotives driven by explosion motors and adapted for railway traffic either for shifting in stations or for drawing trains along.

Locomotives of this type have already been used wherein each motor actuates by means of a special transmission, the axle situated at the same extremity of the vehicle as itself. This arrangement has a very great drawback inasmuch as the vehicle uses all its adherence on the track only when both motors are working. Indeed it is only then the axles of the two ends of the vehicle are both driving axles. When only one motor is used, the only driving axle is that of the corresponding end of the vehicle and for this reason the adherence is reduced by one half which is extremely detrimental when the locomotive is to give an important pulling effort for which however the second motor is not necessary or momentarily not in working order.

By means of the transmission device which is the object of present invention the axles of both extremities are both controlled when any one of the motors is working alone just as well as when both are working. The result is the vehicle can constantly benefit by the entire effort which its total adherence allows it to use.

For this purpose, beyond the change speed gears disposed symmetrically with reference to the central transversal plane and corresponding each to one of the two motors, two pinions of equal diameter are disposed facing each other at the extremities of two shafts in alignment with each other.

These pinions turn in opposite directions in space, the motors being symmetrical and rotating in the same direction. Each of these two pinions meshes with a toothed drum and both toothed drums also of equal diameter are in mesh one with the other.

The result is that both drums, either with one or both motors working rotate at an equal speed and in opposite directions.

Both drums engage besides respectively two toothed wheels of equal diameter mounted loose on an intermediary shaft and adapted to be keyed to said shaft, by means of a clutch device. According as to whether one or the other of the wheels is keyed to shaft, said shaft will rotate in one direction or the other.

This device constitutes a reversing gear. To the intermediary shaft bearing these loose wheels are also secured two other wheels of unequal diameter controlling two wheels loosely mounted on another shaft which is the final shaft of the transmission, rotation of which is directly used. Either of these two loose wheels can be secured to this final shaft according to driver's desire. This arrangement constitutes a double stage change speed device, similar to the one, for instance, which has been described by the applicant in U. S. Patent 1,458,469 filed November 26, 1921.

The above-mentioned final shaft controls simultaneously the axles at both ends of the vehicle through suitable devices such as mitre gears.

It is preferable to be able to control the change speed gears whether with only one motor working or with both motors working by means of only one lever placed in the control cabin disposed in the center of vehicle or on the side of said cabin.

For this purpose the rods holding the corresponding forks controlling the two change speed devices are terminated each with a rack, the two racks corresponding to the same speed in both motors meshing with one same loosely mounted pinion. The several pinions each meshing with two racks secured to two forks controlling two corresponding sliding gears in the two change speed devices are all loosely mounted on one same shaft. If by means of a controlling lever placed within reach of the driver, one of the rods of one of the change speed gears is actuated, evidently an equal displacement in opposite direction of the rod and thereby of the corresponding fork belonging to the other change speed gear will be caused. The same combination of speeds will be thus automatically obtained in the two symmetrical mechanisms.

As in all vehicles of this sort, where there exists a compressor adapted for sending compressed air through suitable pipes into the braking and starting devices, it is necessary that said compressor should be made to start when either of the motors is working, even if the vehicle itself is not moving. In view of this, the compressor is controlled by two pinions chosen so as to show the same number of teeth, both of which are keyed to the primary shafts of the change speed gears corresponding to the two motors. These two pinions, rotating in opposite directions mesh, one of them directly and the other by means of an intermediary wheel which changes the direction of rotation, with two toothed wheels having the same number of teeth and keyed to the shaft actuating the compressor. It should be noted this shaft makes the primary shafts rotate together at the same speed in all cases, even when the vehicle is not moving or one of the motors is not in gear or not secured to transmission. The simultaneous engagement of the speeds in both change speed devices is thus made easier in all cases that may appear.

A form of execution of a transmission device according to the present invention is described hereunder and shown by way of example on appended drawings whereof—

Fig. 4 is a transversal section.

Fig. 5 is a plan view partly sectional.

Fig. 6 is a plan view of the compressor.

Figure 1:
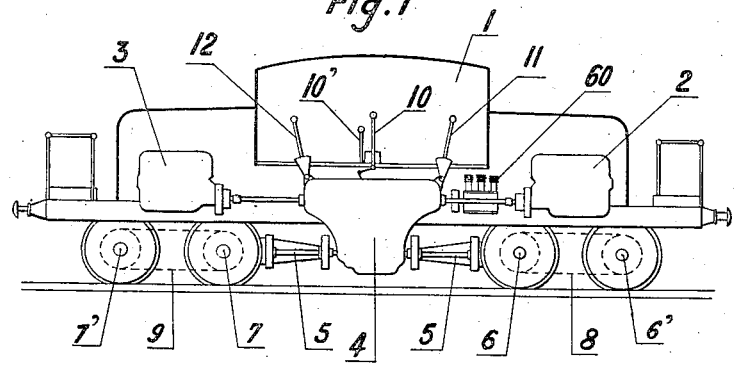
Fig. 1 shows diagrammatically a locomotive provided with the device according to invention.

The locomotive (Fig. 1) is provided with a central cabin 1 and two motors 2, 3 rotating in the same direction and disposed symmetrically at both extremities. The shafts of these two motors pass through the central casing 4 which contains symmetrically disposed parts in the following order: a mechanical connecting device of the two driving shafts with the rest of the mechanism, two change speed gears, and in the center the transmission device.

From the lower part of the casing projects the common shaft 5 controlling directly both axles 6 and 7. The two other axles 6' and 7' in the case where, as shown, the locomotive is provided with 4 driving axles are actuated by means of the chains 8 and 9.

In the cabin are to be found the central lever 10 controlling the change speed device, the lever 10' controlling the reversing gears and the levers 11, 12 allowing respectively, the mechanical isolation of motors 2 and 3 from the rest of the transmission.

Figure 3:
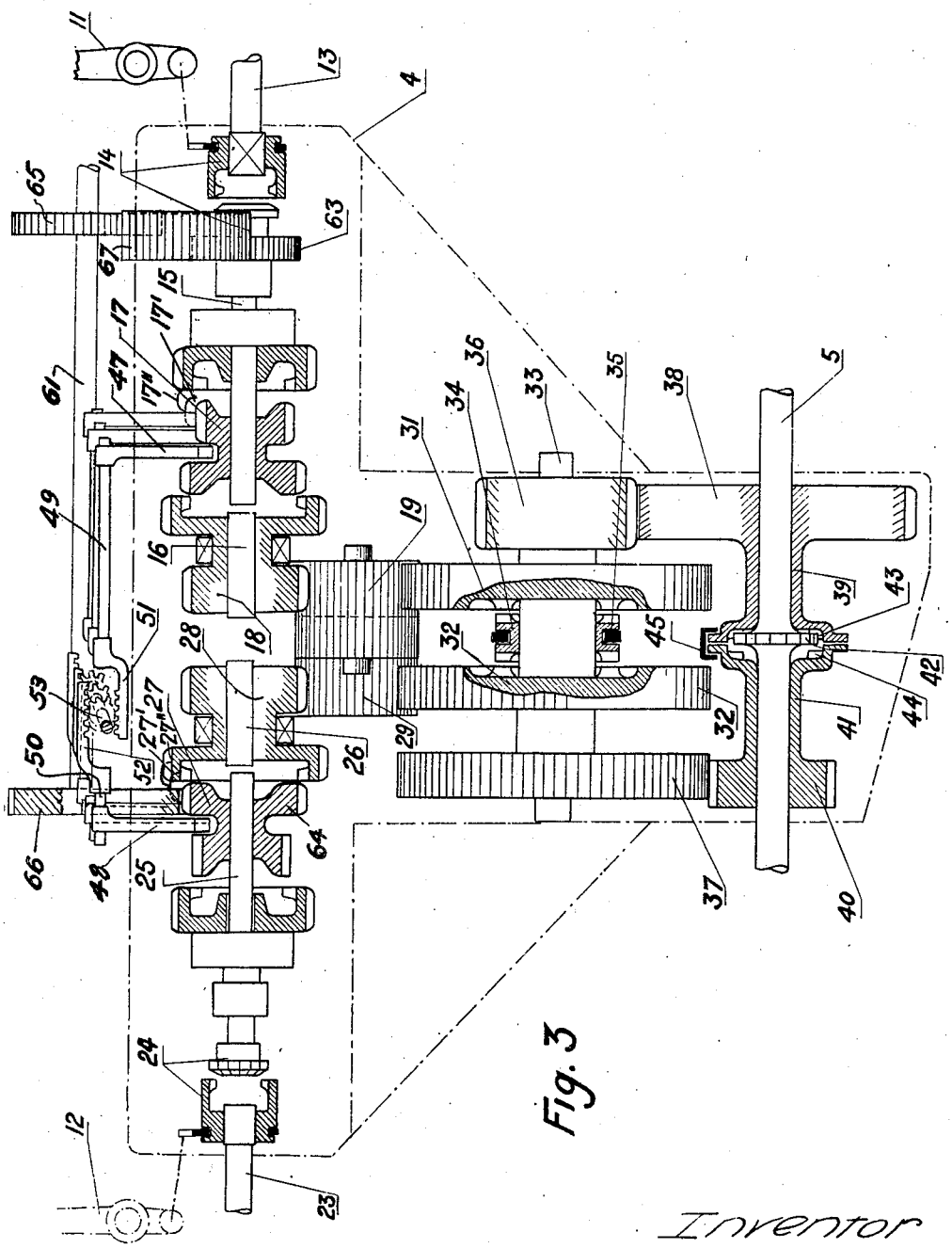
Fig. 3 is a longitudinal sectional view through the casing containing the transmission device.

If for instance shaft 13 (Fig. 3) of motor 2 is considered, it can be seen that after entering the casing it is cut off by a clutch device 14 controlled by lever 11. It allows the disconnection of motor 2. Beyond the clutch device and in line with the shaft 13, is the primary shaft 15 a change speed gear secondary shaft 16 which has its axis in line with that of the primary shaft 15. This change speed gear can be for instance a six speed change speed gear of the type described in French Patent 520,424 of July 12, 1920, to applicant. In Fig. 3 the intermediary shaft of the change speed gear is not shown and is supposed placed behind the primary shaft; only one of the sliding gears 17 is shown which gives the direct engagement and the fifth speed.

The secondary shaft 16 ends with pinion 18. Shaft 23 controlled by motor 3 leads to an exactly symmetrical series of parts: clutch device 24, primary shaft 25, secondary shaft 26, sliding gear 27, pinion 28.

Figure 2:
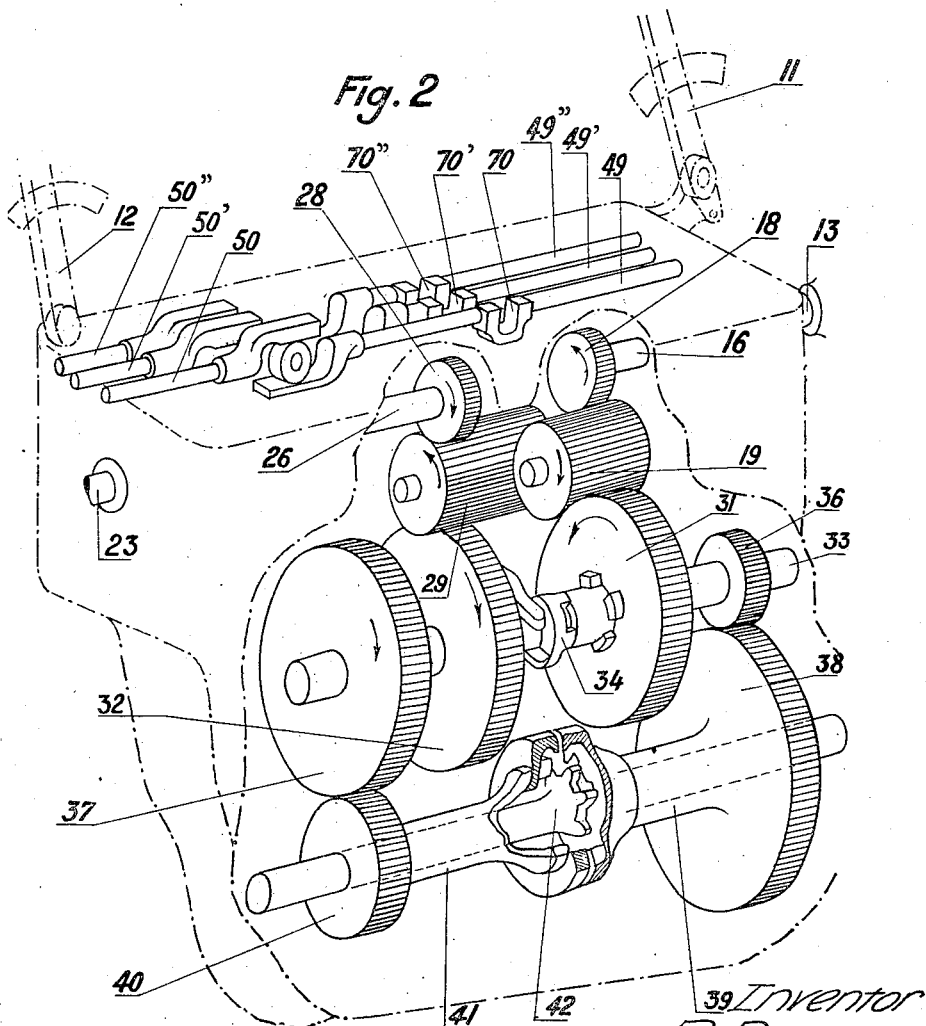
Fig. 2 is a perspective simplified view of the principal part of transmission device.

The two symmetrical pinions 18 and 28 have the same geometrical axis and the same diameter. The pinion 18 (see Figs. 2 and 3) meshes with the toothed drum 19. In a similar manner pinion 28 meshes with toothed drum 29 and the two drums 29 and 19 have same diameter and engage one another.

Under these conditions it is evident that as pinions 18 and 28 belong to two motors rotating in the same direction, but symmetrically disposed, they rotate in opposite directions. The drums 19 and 29 will therefore also rotate in opposite directions and will oblige, through their mutual engagement, the pinions 18 and 28 to rotate also with the same speed.

The drum 19 meshes with the toothed wheel 31 and drum 29 with toothed wheel 32. These toothed wheels 31 and 32 have the same diameter and are mounted loose on an intermediary shaft 33. It is evident both these wheels will always rotate with the same speed and in opposite directions. One or the other of the toothed wheels 31 and 32 can be made to engage with shaft 33 by means of the double clutch 34 longitudinal movement of which along shaft 33 can be controlled through fork 35 (Fig. 4) secured to hand lever 10' (Fig. 1). Through this engagement shaft 33 will be caused to rotate in one direction or the other. A reversing device is thus produced.

The intermediary shaft 33 bears, secured mechanically to one of its extremities, a toothed wheel of small diameter 36 and secured mechanically to its other extremity a toothed wheel 37 of large diameter. Pinion 36 meshes with a toothed wheel 38 secured to a sleeve 39 mounted loosely on shaft 5 adapted for direct use. Similarly wheel 37 meshes with pinion 40 secured to sleeve 41 also borne loosely by shaft 5. A clutch device 42 is keyed on to this said controlling shaft. It can engage either the toothwork 43 or 44 provided respectively on expansions of sleeves 39 and 41. The movement of both sleeves along shaft 5 is controlled by one single fork 45 fitting over said expansions and is combined in such manner as to allow only one of these sleeves 39 or 41 at a time to engage clutch device 42 and thereby to rotate with shaft 5.

Thus it is easy to see that when tooth-work 43 is engaged the gearwork 36, 38 is used which gives the low speeds and that on the contrary, with tooth work 44, the gearwork 37—40 is used which gives the higher speeds. Besides the applicant has already described a change speed gear of this type in his U. S. Patent 1,458,469 filed November 26, 1921.

As stated hereinabove the two change speed gears adapted on each shaft 13 and 23 controlled by motors 2 and 3 comprise a number of slide gears; those giving the direct engagement and the fifth speed are shown on Fig. 3 at 17 and 27. The others are shown diagrammatically at 17', 17" and 27', 27". In order that the locomotive driver should be able to make the speed changes by means of central or lateral control lever 10 (Fig. 1) the following arrangement is used:

The forks 47, 48 (Fig. 3) serving to move the corresponding sliding gears 17, 27 are secured to rods 49, 50 the ends of which are provided with racks 51, 52 both meshing with a pinion 53 loosely mounted on its shaft. Therefore if one of the rods 49 is caused to move by means of lever 10, the other rod 50 will move by an equal amount in the opposite direction. Thereby the two forks 47, 48 and the two sliding gears 17 and 27 will be constantly displaced by exactly corresponding lengths, as the speed change gears are symmetrical. The arrangement is described for the two sliding gears 17 and 27, but it is evident it can be used for all the other change speed sliding gears and that, a series of rods 49, 49', 49", 50, 50', 50" can be used, each of which corresponds to a sliding gear and is provided with a rack. The racks of each two corresponding rods engage one of a series of pinions 53, 53', 53" mounted loosely upon one same shaft. The change speed lever will cause the rods 49, 49', 49" to move in a known way by means of a projection entering successively into notches 70, 70', 70".

The locomotive shows, like all vehicles of this type, an air compressor 60 (Figs. 1 and 6) adapted for providing the compressed air necessary for braking, projecting sand in front of the wheels, starting, etc. . . . Its rotation is controlled by shaft 61 provided with an elastic coupling device 62.

It is important that this compressor should work not only with either motor controlling the transmision but also when said transmission is not actuated, that is when one of the motors is working without the locomotive moving. In view of this the shaft 61 (Fig. 5) is actuated by the transmission in the following manner. To each of the primary shafts 15 and 25 of the two change speed gears corresponding to the two motors 2 and 3 is secured one of the two pinions 63, 64 having same number of teeth and equal diameter. Either or both of these pinions may or may not be one of the usual change speed pinions of the corresponding change speed gear. On the other hand, the shaft 61 bears two equal toothed wheels having the same number of teeth 65, 66. The wheel 66 engages with pinion 64. The wheel 65 is not quite in front of pinion 63, both engaging intermediary wheel 67, this reversing of the direction of rotation being made necessary by reason of the fact that primary shafts 15 and 25 rotate in opposite directions. It can be seen that, if one of the motors is working, the change speed devices being idle that is the locomotive not moving, the two primary shafts will rotate in opposite directions by means of shaft 61. Thus compressor 60 can be actuated. On the other hand through this connection, the two primary shafts will rotate at equal speed and thereby the simultaneous meshing of gears in the two change speed gears caused by the simultaneous moving of the forks provided for by the rods 49, 50, the racks 51, 52 and the loosely mounted pinions 53 will be made easier.

What I claim is:

1. A transmission device for locomotives provided at each extremity with a motor and a number of driving axles, whereby each motor controls independently the said driving axles comprising a change speed gear controlled by each motor, the secondary shaft of each said change speed gear, two equal pinions mounted respectively on the secondary shaft of each said change speed gear and disposed at the extremities facing each other of the said secondary shafts, two toothed drums of equal diameter engaging each one of said equal pinions and meshing one with the other, a shaft controlling all the driving axles, a double-stage change speed device controlling said controlling shaft, the primary shaft of said double-stage change speed device, two pinions mounted loosely on last mentioned shaft and meshing each with corresponding above-mentioned drum, means for securing either of said loosely mounted pinions on to the primary shaft of the double-stage change speed device.

2. A transmission device for locomotives provided at each extremity with a motor and a number of driving axles whereby each motor controls independently the said driving axles, comprising a change speed gear controlled by each motor, the secondary shaft of each said change speed gear, sliding gears in said change speed gears, forks controlling said sliding gears, rods secured to said forks, similar racks provided on said rods, a set of pinions each of which is adapted to be rotated in opposite directions by the racks of corresponding sliding gears in both change speed gears, a shaft on which all pinions of the set are loosely mounted, two equal pinions mounted respectively on the secondary shaft of each said change speed gear and disposed at the extremities facing each other of the said secondary shafts, two toothed drums of equal diameter engaging each with one of said equal pinions and meshing one with the other, a shaft controlling all the driving axles, a double-stage change speed device controlling said controlling-shaft, the primary shaft of said double-stage change speed device, two pinions loosely mounted on last mentioned shaft and meshing each with corresponding abovementioned drum, means for securing either of said loosely mounted pinions on to the primary shaft of the double stage change speed device.

3. A transmission device for locomotives provided at each extremity with a motor and a number of driving axles, whereby each motor controls independently the said driving axles, comprising a change speed gear controlled by each motor, the primary and secondary shafts of each said change speed gear, sliding gears in said change speed gears, forks controlling said sliding gears, rods secured to said forks, similar racks provided on said rods, a set of pinions each of which is adapted to be rotated in opposite directions by the racks of corresponding sliding gears in both change speed gears, a shaft on which all pinions of the set are loosely mounted respectively, two equal pinions mounted on the secondary shaft of each said change speed gear and disposed at the extremities facing each other of the said secondary shafts, two toothed drums of equal diameter engaging each with one of said equal pinions and meshing one with the other, a shaft controlling all the driving axles, a double-stage change speed device controlling said controlling shaft, the primary shaft of said double stage change speed device, two pinions loosely mounted on last mentioned shaft and meshing each with corresponding above-mentioned drum, means for securing either of said loosely mounted pinions on to the primary shaft of the double stage change speed device, two pinions of equal size and number of teeth disposed respectively on the primary shaft of each abovementioned change speed gear, a compressor-driving shaft, a pinion secured to said shaft and engaging the pinion of one of the primary shafts, a second pinion of equal size secured to said shaft, a gear wheel meshing with said second pinion and with the pinion of the other primary shaft.

In testimony whereof I have signed my name to this specification.

PIERRE DONON.